(12) United States Patent
Llamas Sandin et al.

(10) Patent No.: US 8,360,359 B2
(45) Date of Patent: Jan. 29, 2013

(54) AIRCRAFT HORIZONTAL STABILIZER SURFACE

(75) Inventors: Raúl Carlos Llamas Sandin, Madrid (ES); Miguel Luque Buzo, Madrid (ES)

(73) Assignee: Airbus Operations S.L., Madrid (ES)

( * ) Notice: Subject to any disclaimer, the term of this patent is extended or adjusted under 35 U.S.C. 154(b) by 832 days.

(21) Appl. No.: 12/411,506

(22) Filed: Mar. 26, 2009

(65) Prior Publication Data

US 2010/0148000 A1 Jun. 17, 2010

(30) Foreign Application Priority Data

Dec. 17, 2008 (ES) .................................. 200803581

(51) Int. Cl.
*B64C 5/02* (2006.01)
(52) U.S. Cl. ........................................................ 244/87
(58) Field of Classification Search .................... 244/87, 244/88, 45 R, 46, 49
See application file for complete search history.

(56) References Cited

U.S. PATENT DOCUMENTS

| 3,240,448 | A * | 3/1966 | Schaffer .......................... 244/87 |
| 3,307,808 | A * | 3/1967 | Koppen ........................... 244/87 |
| 6,170,780 | B1 * | 1/2001 | Williams ......................... 244/15 |
| 7,216,830 | B2 * | 5/2007 | Quayle et al. .................... 244/15 |
| 7,510,144 | B2 * | 3/2009 | Ambite Iglesias et al. ..... 244/87 |
| 7,735,744 | B2 * | 6/2010 | Eisenhour ................ 237/12.3 B |

FOREIGN PATENT DOCUMENTS

WO  WO 2006073634 A2 *  7/2006

* cited by examiner

*Primary Examiner* — Tien Dinh
*Assistant Examiner* — Michael Kreiner
(74) *Attorney, Agent, or Firm* — Ladas & Parry LLP

(57) ABSTRACT

Aircraft horizontal stabilizer surface (8) in which the sweep angle (40) of this surface (8), where this angle (40) is the one formed by the projection of the reference line of points located at 25% of the local chord (19) of the horizontal stabilizer surface (8) on a plane perpendicular to the aircraft plane of symmetry (21), and which also contains this plane to the flight direction of the aircraft with respect to the aircraft plane of symmetry (21), is less than 90 degrees, with this angle (40) being measured in the flight direction of the aircraft. In addition, the structural connection of this horizontal stabilizer surface (8) to the aircraft fuselage (1) is located at a closing frame (13) of this fuselage (1).

15 Claims, 5 Drawing Sheets

Figure 3A
Prior Art
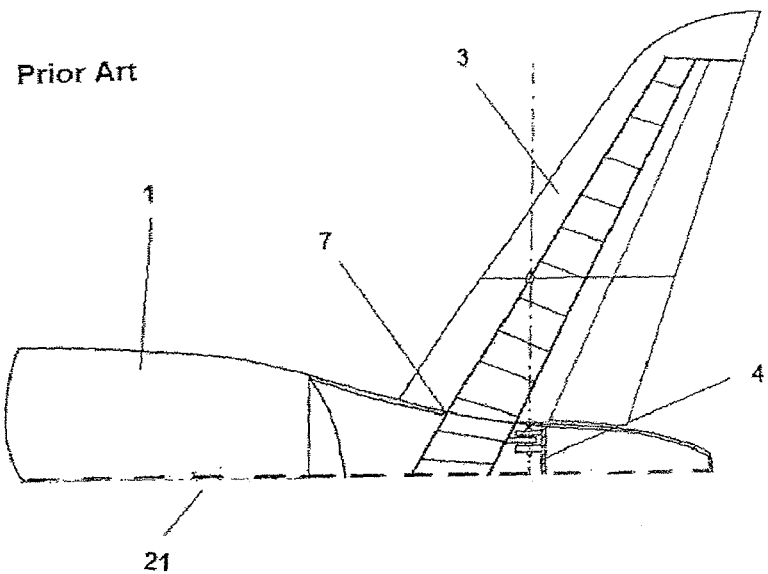
Invention
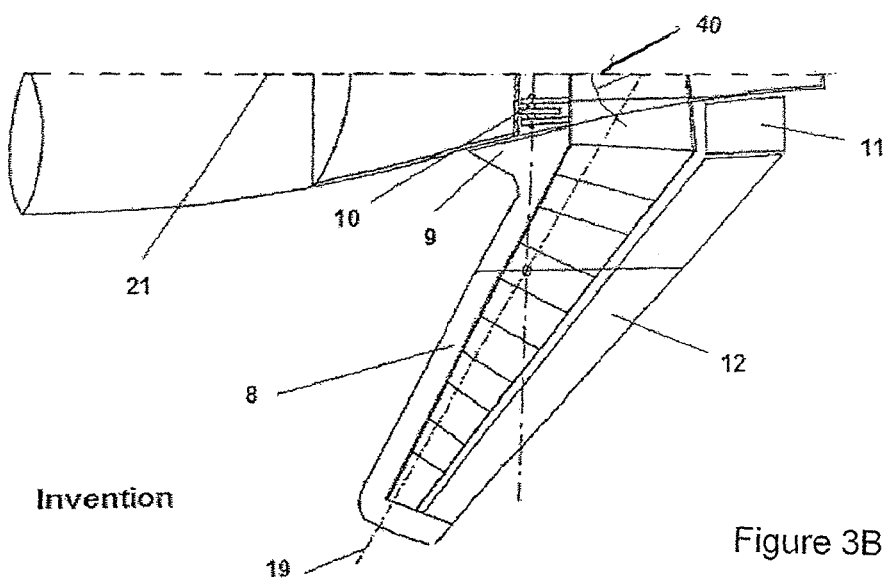
Figure 3B

AIRCRAFT HORIZONTAL STABILIZER SURFACE

FIELD OF THE INVENTION

This invention refers to an aircraft stabilizer surface, and in particular to the configuration of a horizontal stabilizer surface for an aircraft.

BACKGROUND OF THE INVENTION

The sweepback of aircraft airfoils, or inclination of these airfoils in the flight direction, is a design feature of aircraft that fly at speeds approaching the speed of sound, and it is motivated by aerodynamic considerations. The aerodynamic advantage of the sweepback is that the adverse effects of compressibility, caused by the overspeed of the flow over the aerodynamic profile, which grow as the relative thickness of that profile increases, are related to the component of the airflow velocity that is essentially perpendicular to the line of 25% of the chord of the airfoil of the aircraft. Therefore, for a given flight speed, an airfoil with a given sweep angle will be subject to compressibility effects equal to those of an airfoil without sweepback but with an aerodynamic profile of a relative thickness equal to the cosine of the sweep angle. A greater relative profile thickness, defined as the ratio between the maximum thickness of the profile and its length in the flight or chord direction, results in a lower structural weight of the airfoil because the forces on the airfoil skins caused by aerodynamic loads are decreased. However, in the flight at high speed that is characteristic of large modern commercial aircraft, airfoils with large relative thicknesses of the aerodynamic profiles magnify the adverse effects of air compressibility, which can be manifested as shock waves on the airfoil, with an associated increase of the aerodynamic drag and other adverse flight phenomena. Therefore, the sweepback of airfoils serves to achieve a design balance between their structural weight and acceptable in-flight performance at speeds approaching the speed of sound.

The first airplane built for high speed flight with a significant sweep angle was the Junkers 287 in 1945. Among other unique characteristics of this aircraft, the sweep angle of the wings is negative, i.e., the wing tips are moved forward in the flight direction with respect to the root, or connection of the wings to the fuselage. Barring very few exceptions, such as the MBB/HFB 320, the Grumman X-29 and the Sukhoi 47 (all with negative sweepback wings), the immense majority of high speed aircraft are built with positive sweepback wings. Despite certain aerodynamic advantages of the negative sweepback, the fundamental reason for using a positive sweepback in the wings is that, in the event that the aircraft encounters a vertical air speed disturbance or gust during flight, the bending deformation of a wing with positive sweepback tends to decrease the local angle of attack of the wing profiles, which naturally mitigates the aerodynamic loads. In the case of a wing with negative sweepback, the effect is the opposite because, upon encountering a vertical gust, the bending of the wing causes increased angles of attack of the profiles that tend to increase the loads and bending. This means that the wings with negative sweepback tend to withstand significantly higher gust loads than positive sweepback wings and, therefore, they are heavier.

The aerodynamic advantages associated with an airfoil configuration with negative sweepback are well known and documented in the technical aeronautical literature. These advantages can be summarized as follows:

a smaller sweep angle of the leading edge of an airfoil with negative sweepback compared to an airfoil with positive sweepback, both for the same sweep angle of the line of 25% of the chord, results in less of a tendency for the aerodynamic flow to move along the direction of the wingspan, with a resulting reduction of the coefficient of friction in the boundary layer and, therefore, less aerodynamic resistance;

the air movement in the direction of the wingspan is from tip to root in the case of an airfoil with negative sweepback, which results in the possibility of achieving larger angles of stall of aerodynamic lift than in the case of positive sweepback airfoils, in which the transversal airflow in the wingspan direction drags the boundary layer towards the marginal tip or edge, decreasing the energy of the boundary layer in that zone which, as it has a higher local lift coefficient than the root zone, causes separation of the boundary layer with the resulting lift stalling at a smaller angle of attack than in the case of the negative sweepback airfoil; whereas a larger angle of stall of a horizontal stabilizer surface with negative sweepback makes it possible to increase the maximum aerodynamic force for a given surface or else reduce the surface and, therefore, the aerodynamic weight and resistance of that airfoil for the same maximum aerodynamic force, if this is the critical design consideration;

the elastic deformation of the airfoil under aerodynamic load, or aeroelastic deformation, tends to reduce the local angles of attack of the profiles in the case in which the surface has a positive sweepback, and to increase them if the surface has a negative sweepback, with the resulting increase in the aerodynamic lift gradient with the angle of attack in the case of a negative sweepback airfoil; this increase of the lift gradient increases the manoeuvrability of an aircraft with negative sweepback wing, which could be beneficial in the case of a military combat airplane but is usually considered as a drawback for commercial airplanes because the airplane's response sensitivity to vertical gusts is associated with the lift gradient, with which the internal loads and the weight of the wing structure also increase, and this is the main reason that explains the fact that negative sweepback wings are rarely used in commercial aviation (the abovementioned increase of the lift gradient due to the aeroelastic deformation associated with a negative sweepback surface is, however, advisable in the case of a stabilizer surface, since it enables reaching the aerodynamic force value required for the stabilizing function for lower angle of attack values of that surface).

Despite the known aerodynamic advantages mentioned above, negative sweepback wings have associated structural performance complications that have limited their use in the design of airplanes; these can be summarized as follows:

The aeroelastic deformation tends to increase the structural loads and, therefore, the weight of the airfoil, and specifically the wing; moreover, the increased lift gradient of the wing results in a more dynamic response of the airplane to turbulence and to vertical gusts and, therefore, in less comfort for the passengers. However, in the case of a horizontal stabilizing surface of negative sweepback, this greater aerodynamic response to disturbances makes the stabilizer surface more efficient in its function of recovering the position of the airplane in the event that it encounters turbulence or vertical gusts during the flight and, therefore, it is a desirable effect, unlike in the case of the wings.

The geometry of the negative sweepback wing complicates the integration of the landing gear into a low wing commercial airplane because the rear spar forms an angle of more than 90 degrees with the rear of the fuselage, a consideration that does not apply to stabilizer surfaces.

Because of the larger sweep angle of the trailing edge, the flap type high lift systems lose aerodynamic efficiency; this consideration also does not apply to the stabilizer surfaces.

The known drawbacks described above occur specifically in the wings but not on the stabilizer surfaces and, therefore, a horizontal stabilizer surface of negative sweepback would be more efficient (in terms of size, weight and aerodynamic drag) than a horizontal stabilizer surface of positive sweepback, if both stabilizer surfaces have their aerodynamic centre at the same distance from the aerodynamic centre of the wing, where the aerodynamic centre is the characteristic point of a lift or stabilizer surface for purposes of stability and control calculations.

However, there is no known use of horizontal stabilizer surfaces with negative sweepback in airplanes for high speed flight, including those mentioned above with negative sweepback wings.

SUMMARY OF THE INVENTION

Therefore, this invention refers to the field of aircraft stabilizer surfaces, and in particular develops a horizontal stabilizer configuration characterized in that it has a negative sweep angle, and thus the marginal edges of this stabilizer are moved forward with respect to the root of this stabilizer to the aircraft fuselage in the flight direction, as opposed to the known configuration. In addition, the structural configuration of the vertical stabilizer and the aircraft fuselage frames will be such that it enables the connection of the horizontal stabilizer of the invention to the rear end of the fuselage without requiring the fuselage to have a structural opening in a zone very affected by the structural loads introduced by the horizontal and vertical stabilizers, which is characteristic of the known configuration and used in large modern commercial aircraft.

In an embodiment of this invention, the structural connection of the horizontal stabilizer to the aircraft fuselage is made between points of the front spar of the horizontal stabilizer and a fuselage frame, such that a structural opening is not required in the claddings of the fuselage affected by the vertical and horizontal stabilizer load introduction. According to this invention, for the same airplane and absolute value of the sweep angle of the line of 25% of the local chord of the horizontal stabilizer surface, whereby the aerodynamic performance in terms of in-flight compressibility at high speed is maintained, the aerodynamic centre of the horizontal stabilizer as per this invention, where this centre is the geometric point that determines the stabilizing characteristics of the horizontal stabilizer, is located in a position equivalent to the position it would have in a horizontal stabilizer with a known conventional configuration. In other words, with the aerodynamic centre in the same position as in conventional configurations, the stabilizing performance improves thanks to the favourable effects of the negative sweep angle, wherewith, for the same overall performance, the size of the stabilizer can be reduced and, therefore, have a lower weight, cost and drag.

The main advantage of the configuration of the horizontal stabilizer of the invention with respect to the classic known configuration is that it eliminates the structural opening of the fuselage, in a zone very stressed by the loads introduced by the vertical and horizontal stabilizers. Consequently, the structural weight of the fuselage is reduced on eliminating the reinforcements required by the opening, and at the same time the rigidity of the fuselage is increased in the installation zone of the horizontal stabilizer, which results in enhanced effectiveness of this stabilizer on reducing the deformations of the fuselage under aerodynamic load.

Likewise, with the horizontal stabilizer configuration of the invention and for the same efficiency as a stabilizer surface, it is possible to reduce the area of this surface because the deformation of the structure under aerodynamic load causes an increase of the local angles of attack, with the resulting increase of the lift force. In the case of the wings, this effect produces greater internal loads in the structure for a fixed wing surface determined by the airplane weight and, therefore, it is considered as negative since it leads to heavier wings. In the case of a horizontal stabilizer surface, when the required area of this stabilizer surface is determined by the rate of increase of aerodynamic force with the variation of the angle of attack or lift gradient, e.g. caused by a disturbance due to a vertical in-flight gust, the effect of an increasing aerodynamic load due to the structural flexibility of this stabilizer with negative sweepback causes an increase in this lift gradient, thus enabling a reduction of the stabilizer surface area.

In addition, this configuration enables, if deemed advisable, having a negative dihedral angle on the stabilizer surface, i.e., to have the tips of the stabilizer surface situated below the root. Aircraft are designed in such a way that, in the event of takeoffs and landings with high roll angles or high lateral inclination of the airplane, the stabilizer surfaces do not touch the ground. Due to stability and control considerations, each aircraft will have an optimal dihedral angle, either positive (above the root) or negative (below the root). In the case in which the optimal dihedral angle is negative, the conventional configurations of horizontal stabilizer surfaces with positive sweepback present the geometric limitation of the angle that must be observed in takeoff. Thus, due to the positive sweepback of conventional configurations of horizontal stabilizer surfaces, if these have a negative dihedral angle, it is possible that contact with the ground will occur in possible positions of the airplane near the ground.

Other characteristics and advantages of this invention are provided in the following detailed description of an illustrative embodiment of its object in relation to the accompanying figures.

DESCRIPTION OF THE FIGURES

FIGS. 3A and 3B show detailed cross-section views through the aircraft plane of symmetry of the rear fuselage and the stabilizers and rudders of a modern commercial airplane. FIG. 3A shows a partial view of a horizontal stabilizer with positive sweepback and the fuselage construction fittings according to the known state of the art. FIG. 3B shows a partial view of a horizontal stabilizer with negative sweepback according to this invention, including the structural connection fittings to the fuselage and the arrangement of the control surfaces.

DETAILED DESCRIPTION OF THE INVENTION

Figure 1:
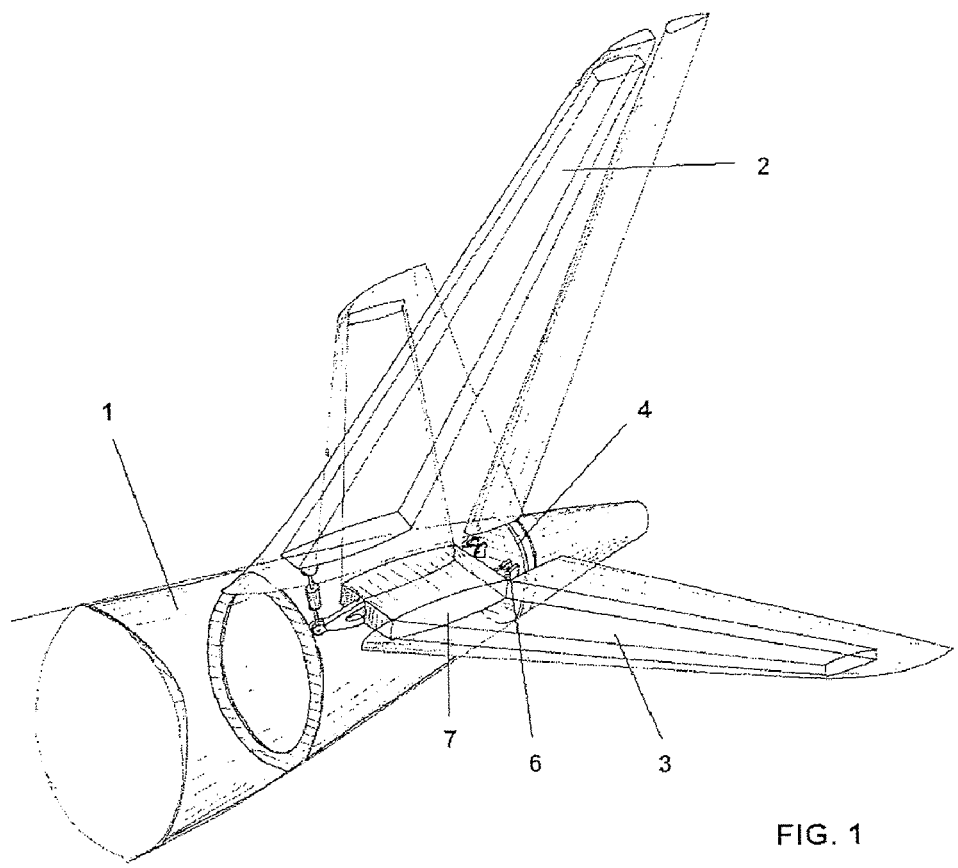
FIG. 1 shows a schematic perspective view of the rear fuselage and the stabilizers and rudders of a modern commercial airplane, which schematically shows the arrangement of the actuators and flap fittings for a horizontal stabilizer with positive sweepback, according to the known state of the art.

Therefore, this invention refers to a horizontal stabilizer with negative sweepback located at the rear end of an aircraft, in which the position of its aerodynamic centre is equal to the position of the aerodynamic centre of an equivalent horizontal stabilizer with conventional configuration. Moreover, the negative sweepback horizontal stabilizer of the invention avoids the need to make a structural opening in the rear end of the fuselage affected by the vertical stabilizer loads, and all this also makes it possible to take advantage of the aerodynamic advantages associated with the negative sweepback airfoils.

The characteristics of the horizontal stabilizer of this invention will be better understood with a description of a preferential embodiment of a stabilizer surface with negative sweepback of a modern commercial airplane, as shown in FIGS. 3 (lower), 4 and 5.

Thus, the invention refers to a horizontal stabilizer surface 8 with negative sweepback, such that the sweep angle 40 formed by the projection of the reference line of points located at 25% of the local chord 19 of the horizontal stabilizer surface 8 on a plane perpendicular to the aircraft plane of symmetry 21, and which contains the flight direction of this aircraft with respect to the plane of symmetry 21, is less than 90 degrees (see bottom of FIG. 3), where this angle 40 is measured in the flight direction. The dihedral angle of the horizontal stabilizer surface 8 of the invention can be negative, such that the tip of this surface 8 is located below the root of this surface 8 to the fuselage 1 of the aircraft. The dihedral angle is the one formed by the line of 25% of the chord 19 of the horizontal stabilizer surface 8 with respect to the projection of this line on the aircraft plane of symmetry 21, and this plane is also parallel to the flight direction of the aircraft in question. The dihedral angle of the horizontal stabilizer surface 8 can also be positive, meaning that the tip of this surface 8 is located above the root of this surface 8 to the fuselage 1 of the aircraft.

Figure 2:
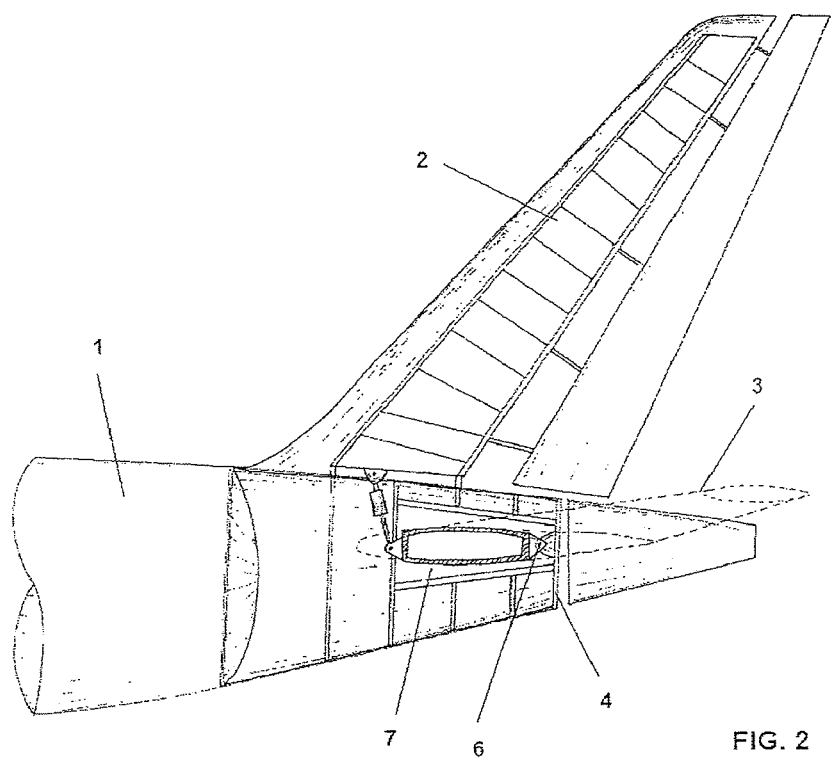
FIG. 2 shows a schematic cross-section view through the aircraft plane of symmetry of the rear fuselage and the stabilizers and rudders of a modern commercial airplane, which schematically shows the arrangement of the actuators, flap fittings and structural opening in the fuselage for a horizontal stabilizer with positive sweepback, according to the known state of the art.
Figure 4:
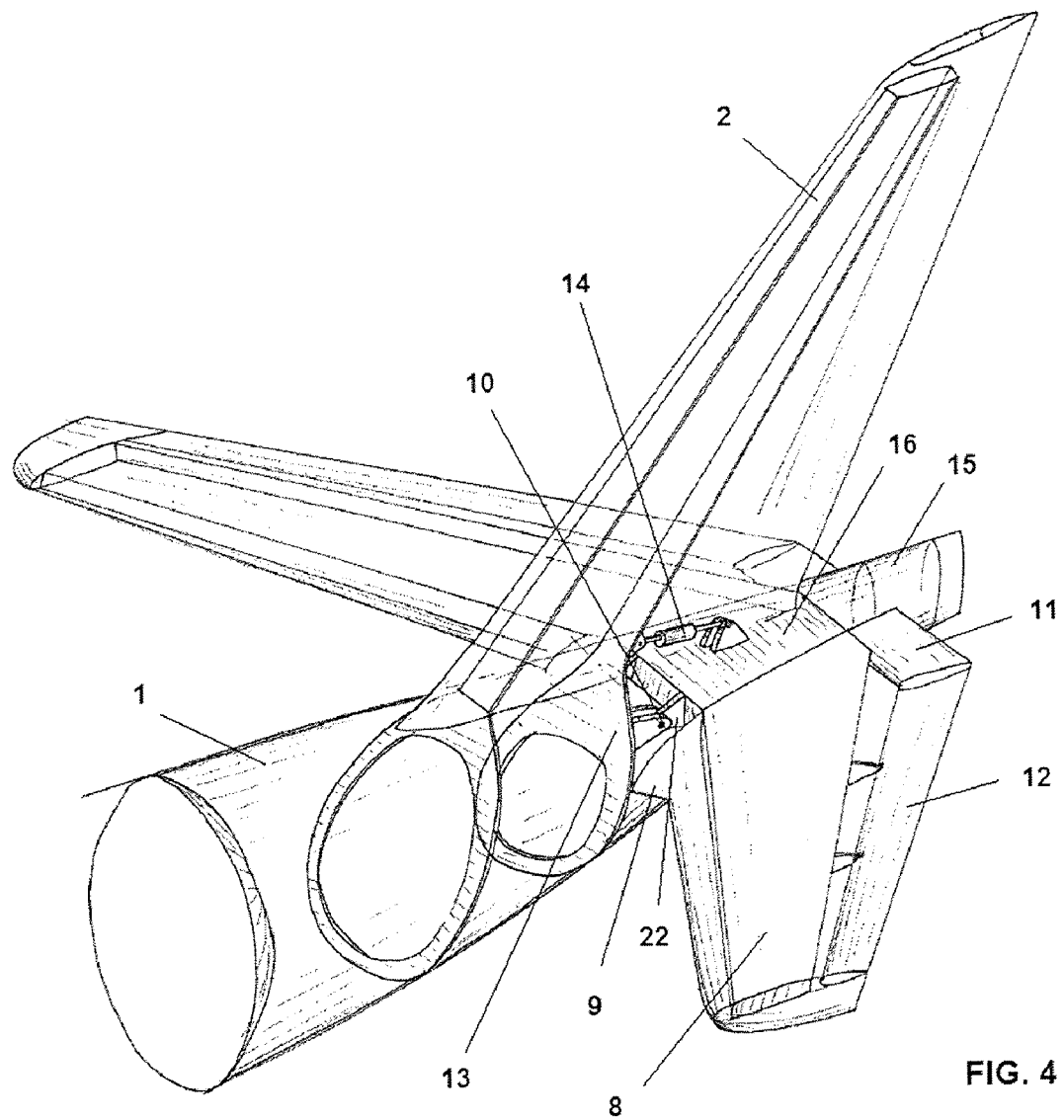
FIG. 4 shows a schematic perspective view of the rear fuselage and the stabilizers and rudders of a modern commercial airplane, which schematically shows the arrangement of the actuators and flap fittings for a horizontal stabilizer with negative sweepback according to this invention.
Figure 5:
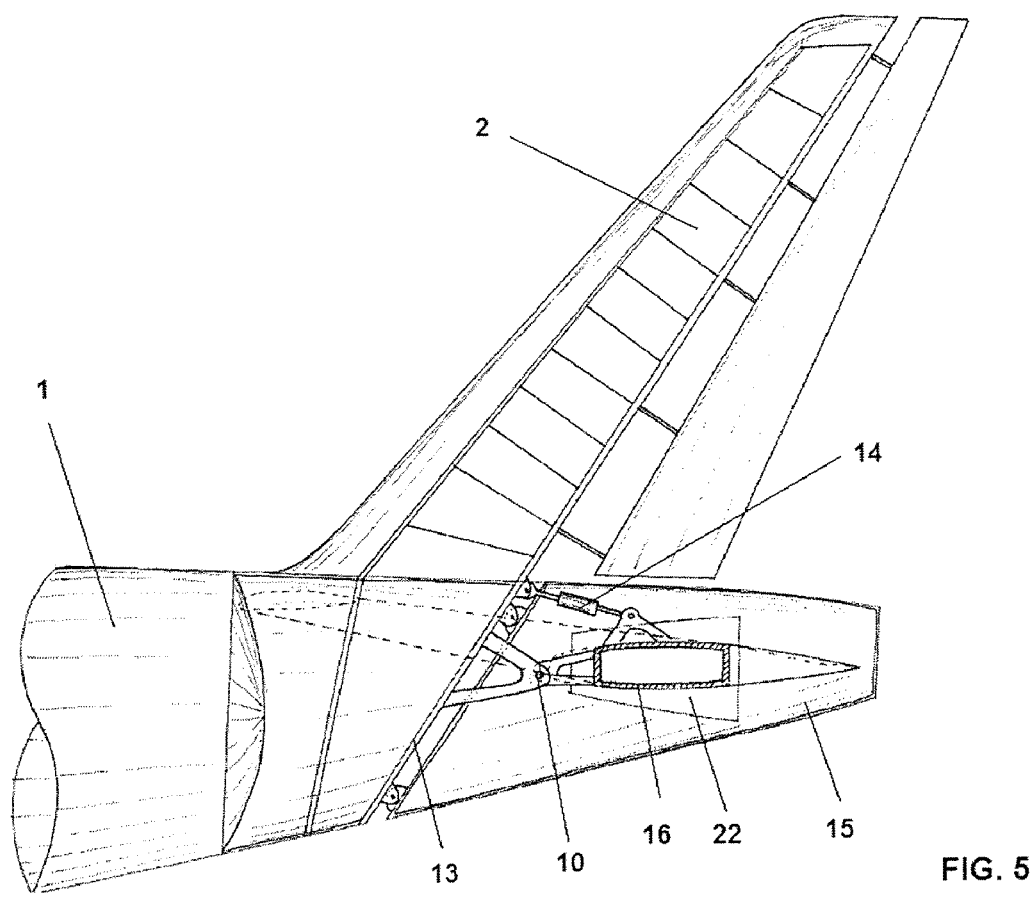
FIG. 5 shows a schematic cross-section view through the aircraft plane of symmetry of the rear fuselage and the stabilizers and rudders of a modern commercial airplane, which schematically shows the arrangement of the actuators, flap fittings and structural opening in the fuselage for a horizontal stabilizer with negative sweepback, according to this invention.

In this invention, the structural connection of the horizontal stabilizer surface 8 to the fuselage 1 of the aircraft is achieved by means of a closing frame 13 of this fuselage 1, meaning that it does not require the provision of a structural opening 7 that is typical of the conventional configuration shown in FIGS. 1, 2 and 3 (top), where the connection is made with fittings 6 connected to a frame 4, such that the loads introduced in the fuselage 1 by the vertical stabilizer 2 and by the horizontal stabilizer 3 itself in the fuselage 1 section affected by the structural opening 7 require the incorporation of specific reinforcements into this fuselage 1. The structural connection between the horizontal stabilizer surface 8 and the fuselage 1 of the aircraft in the invention comprises at least one additional connection 14 that provides structural stability to the surface 8 and that may correspond to an actuation mechanism 14 that enables the trimming or turning of the stabilizer surface 8 around an axis perpendicular to the aircraft plane of symmetry 21, such that the fuselage 1 section that receives and transmits the loads of the vertical stabilizer 2 does not have an opening to enable installation of the horizontal stabilizer surface 8.

Thus, the horizontal stabilizer surface 8 of this invention is trimmable, i.e., it can turn upwards or downwards, at an angle of typically less than 30 degrees, in each direction around an axis perpendicular to the aircraft plane of symmetry 21 and that passes through the structural anchor points 10 to a frame 13 of the fuselage 1. This stabilizer surface 8 is turned by actuation of a mechanical device 14 that may be of the worm gear type or any other type of those used to move the stabilizer surfaces and to control aircraft.

In this invention, the rear end of the fuselage 15 only withstands aerodynamic and inertia loads and not loads introduced by the horizontal stabilizer 8 and vertical stabilizer 2 and, therefore, it does not require specific reinforcements in the structural opening 22 needed for passage of the central structure 16 of the horizontal stabilizer 8.

According to an embodiment of this invention, the leading edge of the horizontal stabilizer 8 comprises a local extension 9 in the flight direction of the aircraft, in the zone adjacent to the fuselage 1. The local extension 9 preferably has an essentially triangular shape and is designed to offset the loss of airflow speed in the boundary layer of the fuselage 1, such that it prevents the formation of horseshoe vortices around the root of this stabilizer surface 8 to this fuselage 1 at small angles of attack of this horizontal stabilizer surface 8.

The extension 9 of the leading edge of the horizontal stabilizer surface 8 in the zone adjacent to the aircraft fuselage 1 is designed so that the radius of curvature of the leading edge of this extension 9 is less than on the rest of the leading edge of the horizontal stabilizer 8, in order to provoke a controlled separation of the aerodynamic flow at high angles of attack of this surface 8 in the form of a vortex that delays the generalized separation of the aerodynamic flow over this stabilizer surface 8, known as stall, and that, therefore, increases the maximum angle of attack in which this stabilizer surface 8 is effective.

According to an embodiment of the invention, the portion of the trailing edge of the horizontal stabilizer 8 closest to the aircraft plane of symmetry 21 is essentially perpendicular to this plane.

In an embodiment of the invention, at least one portion of the trailing edge of the horizontal stabilizer 8, in the part closest to the aircraft plane of symmetry 21, has a much smaller sweep angle than in the outer portion of the trailing edge, such that the inner zone of the horizontal stabilizer 8 comprises at least one control surface called inner elevator 11, where the trailing edge of this inner elevator 11 is essentially perpendicular to the plane of symmetry 21. In turn, the horizontal stabilizer 8 comprises at least one control surface called outer elevator 12 that occupies the portion farthest from the aircraft plane of symmetry 21, in the outer zone of the trailing edge of this surface 8.

Those modifications included within the scope defined by the following claims can be introduced into the embodiments described above.

The invention claimed is:

1. Horizontal stabilizer surface mounted on an aircraft fuselage at a point thereof, wherein the sweep angle of the horizontal stabilizer surface, formed by the projection of the reference line of points located at 25% of the local chord of the horizontal stabilizer surface on a plane perpendicular to the aircraft plane of symmetry, this plane also comprising the flight direction of the aircraft, with respect to the aircraft plane of symmetry, is less than 90 degrees, said angle being measured in the flight direction of the aircraft, and said horizontal stabilizer surface having an aerodynamic center which aerodynamic center is aligned with the point at which the stabilizer is connected with the fuselage.

2. Horizontal stabilizer surface of an aircraft according to claim 1, wherein structural connection of this horizontal stabilizer surface to the aircraft fuselage is located at a closing frame of this fuselage.

3. Horizontal stabilizer surface of an aircraft according to claim 1, wherein the position of the aerodynamic centre of this stabilizer surface is located in a position on the sweep angle of the line of 25% of the local chord of the surface.

4. Horizontal stabilizer surface of an aircraft according to claim 1, wherein the configuration of this surface is such that it has a negative dihedral angle, such that the tip of this surface is located below the root of this surface to the fuselage, where the dihedral angle is the one formed by the line of 25% of the chord of the horizontal stabilizer surface with respect to the projection of this line on a plane perpendicular to the aircraft plane of symmetry.

5. Horizontal stabilizer surface of an aircraft according to claim 1, wherein the configuration of this surface is such that it has a positive dihedral angle, such that the tip of this surface is located above the root of this surface to the fuselage, where the dihedral angle is the one formed by the line of 25% of the chord of the horizontal stabilizer surface with respect to the projection of this line on a plane perpendicular to the aircraft plane of symmetry.

6. Horizontal stabilizer surface of an aircraft according to claim 1, wherein the leading edge of this horizontal stabilizer surface comprises a local extension in the flight direction of the aircraft, in the zone adjacent to the aircraft fuselage, to offset the loss of airflow speed in the boundary layer of the fuselage, such that it prevents the formation of horseshoe vortices around the root of this stabilizer surface to this fuselage at small angles of attack of this horizontal stabilizer surface.

7. Horizontal stabilizer surface of an aircraft, according to claim 6, wherein the local extension of the leading edge of this horizontal stabilizer surface has an essentially triangular shape oriented perpendicular the plane of symmetry of the aircraft and parallel to the direction of motion.

8. Horizontal stabilizer surface of an aircraft according to claim 1, wherein the portion of the trailing edge of this surface closest to the aircraft plane of symmetry is essentially perpendicular to this plane of symmetry.

9. Horizontal stabilizer surface of an aircraft according to claim 1, which also comprises, in its zone closest to the aircraft plane of symmetry, at least one control surface called inner elevator, where the trailing edge of this inner elevator is essentially perpendicular to the aircraft plane of symmetry.

10. Horizontal stabilizer surface of an aircraft according to claim 1, which also comprises at least one control surface called outer elevator located in the portion farthest from the aircraft plane of symmetry, in the outer zone of the trailing edge of this surface.

11. Horizontal stabilizer surface mounted on an aircraft fuselage, wherein the sweep angle of the horizontal stabilizer surface, formed by the projection of the reference line of points located at 25% of the local chord of the horizontal stabilizer surface on a plane perpendicular to the aircraft plane of symmetry, this plane also comprising the flight direction of the aircraft, with respect to the aircraft plane of symmetry, is less than 90 degrees, said angle being measured in the flight direction of the aircraft said horizontal stabilizer surface having an aerodynamic center which aerodynamic center is aligned with or located ahead of the location at which the stabilizer is connected with the fuselage and wherein structural connection of this horizontal stabilizer surface to the aircraft fuselage is located at a closing frame of the fuselage and wherein the structural connection between the horizontal stabilizer surface and the aircraft fuselage comprises at least one additional connection further comprising an anchor point attached to the central structure of the surface, which provides structural stability to this surface.

12. Horizontal stabilizer surface of an aircraft according to claim 11, wherein the additional connection is such that it enables trimming or turning of this stabilizer surface around an axis perpendicular to the aircraft plane of symmetry and wherein said anchor point and said at least one additional connection are attached to said closing frame.

13. Horizontal stabilizer surface of an aircraft according to claim 12, wherein the trimming or turning of this stabilizer surface is less than 30° in each turning direction.

14. Horizontal stabilizer surface mounted on an aircraft fuselage, wherein the sweep angle of the horizontal stabilizer surface, formed by the projection of the reference line of points located at 25% of the local chord of the horizontal stabilizer surface on a plane perpendicular to the aircraft plane of symmetry, this plane also comprising the flight direction of the aircraft, with respect to the aircraft plane of symmetry, is less than 90 degrees, said angle being measured in the flight direction of the aircraft wherein there is a structural connection between the horizontal stabilizer surface and the aircraft fuselage which comprises at least one additional connection attached to the central structure of the surface, which provides structural stability to this surface.

15. Horizontal stabilizer mounted on an aircraft fuselage, said stabilizer having a surface and a central structure wherein the sweep angle of the horizontal stabilizer surface formed by the projection of the reference line of points located at 25% of the local chord of the horizontal stabilizer surface on a plane perpendicular to the aircraft plane of symmetry this plane also comprising the flight direction of the aircraft, with respect to the aircraft plane of symmetry, is less than 90 degrees, said angle being measured in the flight direction of the aircraft, said horizontal stabilizer surface being mounted on said fuselage through a structural anchor point situated at a location that is forward, in the direction of flight, of an opening in the fuselage through which central structure of the stabilizer extends.

* * * * *